United States Patent
Kang et al.

(10) Patent No.: US 10,186,154 B2
(45) Date of Patent: Jan. 22, 2019

(54) DEVICE AND METHOD FOR DETECTING SURROUNDING VEHICLES

(71) Applicant: HANWHA LAND SYSTEMS CO., LTD., Gyeongsangnam-do (KR)

(72) Inventors: Dong Hun Kang, Changwon-si (KR); Dong Shin Kim, Changwon-si (KR)

(73) Assignee: HANWHA LAND SYSTEMS CO., LTD., Changwon-si (KR)

( * ) Notice: Subject to any disclaimer, the term of this patent is extended or adjusted under 35 U.S.C. 154(b) by 4 days.

(21) Appl. No.: 15/309,919

(22) PCT Filed: Jun. 17, 2014

(86) PCT No.: PCT/KR2014/005292
§ 371 (c)(1),
(2) Date: Nov. 9, 2016

(87) PCT Pub. No.: WO2015/170794
PCT Pub. Date: Nov. 12, 2015

(65) Prior Publication Data
US 2017/0148326 A1    May 25, 2017

(30) Foreign Application Priority Data

May 9, 2014    (KR) .................. 10-2014-0055516

(51) Int. Cl.
*G08G 1/16*        (2006.01)
*G01B 11/14*       (2006.01)
*B60W 40/02*       (2006.01)
*G01P 13/00*       (2006.01)
*G01S 17/42*       (2006.01)
*G01S 17/87*       (2006.01)
(Continued)

(52) U.S. Cl.
CPC ............. *G08G 1/166* (2013.01); *B60W 40/02* (2013.01); *G01B 11/14* (2013.01); *G01P 13/00* (2013.01); *G01S 7/4808* (2013.01); *G01S 17/42* (2013.01); *G01S 17/87* (2013.01); *G01S 17/89* (2013.01); *G01S 17/936* (2013.01); *G08G 1/167* (2013.01)

(58) Field of Classification Search
CPC ......... G01B 11/14; G01P 13/00; G08G 1/166; B60W 40/02
See application file for complete search history.

(56) References Cited

U.S. PATENT DOCUMENTS 9,472,104 B2 *  10/2016  Hyde .................... G06Q 40/08
2005/0143911 A1 *  6/2005  Ishibashi ............ G01C 21/3658
                                                                701/423

FOREIGN PATENT DOCUMENTS

JP    2011-48420 A     3/2011
JP    2012-121524 A    6/2012
(Continued)

OTHER PUBLICATIONS

Communication dated Feb. 4, 2015 issued by the International Searching Authority in counterpart International Application No. PCT/KR2014/005292 (PCT/ISA/210).

*Primary Examiner* — Bryan Bui
(74) *Attorney, Agent, or Firm* — Sughrue Mion, PLLC

(57) ABSTRACT

One technical problem to be solved by the present invention relates to a device and a method for detecting surrounding vehicles, which are capable of correcting information on detected surrounding vehicles on the basis of the degree of energy necessary for cars to normally move along lanes and leave the corresponding lanes.

20 Claims, 9 Drawing Sheets

(51) Int. Cl.
  *G01S 17/89* (2006.01)
  *G01S 17/93* (2006.01)
  *G01S 7/48* (2006.01)

(56) References Cited

FOREIGN PATENT DOCUMENTS

| | | |
|---|---|---|
| KR | 2000-0013674 A | 3/2000 |
| KR | 10-0829904 B1 | 5/2008 |
| KR | 10-0874890 B1 | 12/2008 |
| KR | 10-0956858 B1 | 5/2010 |
| KR | 10-2011-0025254 A | 3/2011 |
| KR | 10-2013-0078382 A | 7/2013 |

\* cited by examiner

DEVICE AND METHOD FOR DETECTING SURROUNDING VEHICLES

CROSS-REFERENCE TO THE RELATED APPLICATION

This application is a National Stage of International Application No. PCT/KR2014/005292, filed Jun. 17, 2014 which claims priority from Korean Patent Application No. 10-2014-0055516, filed on May 9, 2014, in the Korean Intellectual Property Office, the disclosures of which are incorporated herein in their entirety by reference.

BACKGROUND

Unmanned vehicles are vehicles that can identify roads and geographical features and can drive themselves to a destination without a human operator on board. Unmanned vehicles are also referred to as autonomous vehicles.

A sensor or detector such as a laser scanner sensor is used for an unmanned vehicle to detect and keep track of surrounding vehicles. Examples of the laser scanner sensor, which is for the unmanned vehicle to detect and keep track of surrounding vehicles, include a two-dimensional (2D) laser scanner sensor and a three-dimensional (3D) laser scanner sensor.

In the case of using the 2D laser scanner sensor, the probability of false detection of surrounding vehicles exists due to less sensor data available and noise. On the other hand, the 3D laser scanner sensor is relatively expensive and produces a large amount of data to be processed.

Thus, a technique is needed to lower the rate of false detection of surrounding vehicles even when using a two-dimensional (2D) laser scanner sensor.

SUMMARY

To address the aforementioned problems, one or more exemplary embodiments provide a device and method for detecting surrounding vehicles, which are capable of correcting information about detected surrounding vehicles based on information about an energy state of the surrounding vehicles related to lane changes in a road.

One or more exemplary embodiments also provide a device and method for detecting surrounding vehicles, which can determine an amount of energy required for a vehicle to leave a lane that the vehicle currently is in, by using a Gaussian mixture model.

However, the inventive concept is not restricted to those embodiments set forth herein. The inventive concept will become more apparent to one of ordinary skill in the art by referencing the detailed description of the exemplary embodiments given below.

According to an exemplary embodiment, there is provided a device for detecting surrounding vehicles. The device may include: a first information generating unit configured to generate first location information and first traveling direction information of one or more nearby vehicles, including a first nearby vehicle, of an operating vehicle by matching valid data, acquired from sensing data obtained by sensing surroundings of the operating vehicle using a sensor, to a preset vehicle model; a second information generating unit configured to determine an energy state of the first nearby vehicle, and generate second traveling direction information of the first nearby vehicle based on the first location information of the first nearby vehicle, road information data which includes information about a direction that is set to be travelled in each lane in a road where the operating vehicle is driven, and the energy state of the first nearby vehicle; and a determining unit configured to determine a final traveling direction of the first nearby vehicle based on the first traveling direction information of the first nearby vehicle and the second traveling direction information of the first nearby vehicle. The device may further include: a providing unit configured to receive the sensing data obtained by the sensor which is installed in the operating vehicle and senses the surroundings of the operating vehicle; and an acquisition unit configured to acquire the valid data from the sensing data.

The acquisition unit may classify the received sensing data according to predefined settings and acquire one or more data groups, related to the road, from among the classified data as the valid data, and the first information generating unit may generate the first location information and the first traveling direction information of the nearby vehicles by matching each of the data groups to a preset vehicle model.

The first information generating unit may generate the first traveling direction information of the first nearby vehicle corresponding to a particular group matched to the preset vehicle model, using the road information data.

If the determined energy state is below a predetermined state, the second information generating unit may acquire a direction that is set to be travelled in a lane including a first location in the road, corresponding to the first location information, of the first nearby vehicle from the road information data, and generate the direction as the second traveling direction information of the first nearby vehicle.

If a distance between the first location, corresponding to the first location information, of the first nearby vehicle and a lane line nearest to the first location of the first nearby vehicle in the road is less than a predetermined value, and a lane including the first location of the first nearby vehicle in the road differs from a lane where the first nearby vehicle was in the road during a previous cycle generated by the first information generating unit, and if at least one energy state detected from the first nearby vehicle within a preset time period exceeds the predetermined state, the second information generating unit may acquire a direction that is set to be travelled in the lane including the first location of the first nearby vehicle from the road information data and generate the acquired direction as the second traveling direction information of the first nearby vehicle.

If none of energy states detected from the first nearby vehicle within the preset time period exceed the predetermined state, the second information generating unit may acquire a direction that is set to be travelled in the lane where the first nearby vehicle was during the previous cycle from the road information data and generate the acquired direction as the second traveling direction information of the first nearby vehicle.

The second information generating unit may further generate second location information of the first nearby vehicle, and determines a center of a lane in the road including the first location, corresponding to the first location information, of the first nearby vehicle as the second location information of the first nearby vehicle.

The second information generating unit may determine the energy state of the first nearby vehicle using a Gaussian mixture model.

The second information generating unit may determine that the closer is the first location, corresponding to the first location information, of the first nearby vehicle to a lane line nearest to the first location, the higher is the energy state of the first nearby vehicle.

The second information generating unit may determine that the larger is an angle between a first traveling direction, corresponding to the first traveling direction information, of the first nearby vehicle and a lane line closest to the first nearby vehicle, the higher is the energy state of the first nearby vehicle.

The sensor may be a two-dimensional (2D) laser scanner sensor.

According to an exemplary embodiment, there is provided a method of detecting surrounding vehicles. The method may include: receiving sensing data obtained by sensing surroundings of a vehicle using a sensor of the vehicle; acquiring valid data from the sensing data; generating first location information and first traveling direction information of one or more nearby vehicles, including a first nearby vehicle, by matching the valid data to a preset vehicle model; determining an energy state of the first nearby vehicle, and generating second traveling direction information of the first nearby vehicle based on the first location information of the first nearby vehicle, road information data which includes information about a direction that is set to be travelled in each lane in a road where the operating vehicle is driven, and the energy state of the first nearby vehicle; and determining a final traveling direction of the first nearby vehicle based on the first traveling direction information of the first nearby vehicle and the second traveling direction of the first nearby vehicle.

According to an exemplary embodiment, there is provided a device for detecting surrounding vehicles which may include: a first information generating unit configured to generate first location information and first traveling direction information of a nearby vehicle of an operating vehicle by matching road data, obtained by a sensor of the operating vehicle in a road where the operating vehicle is driven, to a preset vehicle model; a second information generating unit configured to determine information about lane change by the nearby vehicle between lanes in the road, and generate second traveling direction information of the nearby vehicle based on the first location information of the first nearby vehicle, prestored road information data including information about a direction that is set to be travelled in each lane in the road, and the information about lane change by the nearby vehicle; and a determining unit configured to determine a final traveling direction of the first nearby vehicle based on the first traveling direction information of the first nearby vehicle and the second traveling direction information of the first nearby vehicle.

According to the exemplary embodiments, error in location and traveling direction information of nearby vehicles can be reduced.

Also, nearby vehicles can be detected with precision without using a three-dimensional (3D) laser scanner sensor, which is relatively more expensive than a two-dimensional (2D) laser scanner sensor.

Other features and exemplary embodiments may be apparent from the following detailed description, the drawings, and the claims

BRIEF DESCRIPTION OF THE DRAWINGS

The above and other features of the inventive concept will become more apparent by describing in detail exemplary embodiments thereof with reference to the attached drawings, in which.

DETAILED DESCRIPTION OF THE EXEMPLARY EMBODIMENTS

The inventive concept will now be described more fully hereinafter with reference to the accompanying drawings, in which exemplary embodiments are shown. This inventive concept may, however, be embodied in different forms and should not be construed as limited to the embodiments set forth herein. Rather, these embodiments are provided so that this disclosure will be thorough and complete, and will filly convey the scope of the inventive concept to those skilled in the art. The same reference numbers indicate the same components throughout the specification.

If a component is expressed as "linked" or "connected" to other component, a component should be understood that it may be not only directly linked or connected to other component, but also indirectly linked or connected. On the other hand, if a component is expressed as "directly linked" or "directly connected" to other component, it should be understood that there is no component between these two components.

Unless defined otherwise, all technical and scientific terms used herein have the same meaning as commonly understood by one of ordinary skill in the art to which the exemplary embodiments belong. It is noted that the use of any and all examples, or exemplary terms provided herein is intended merely to better illuminate the invention and is not a limitation on the scope of the inventive concept unless otherwise specified. Further, unless defined otherwise, all terms defined in generally used dictionaries may not be overly interpreted.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Figure 1:
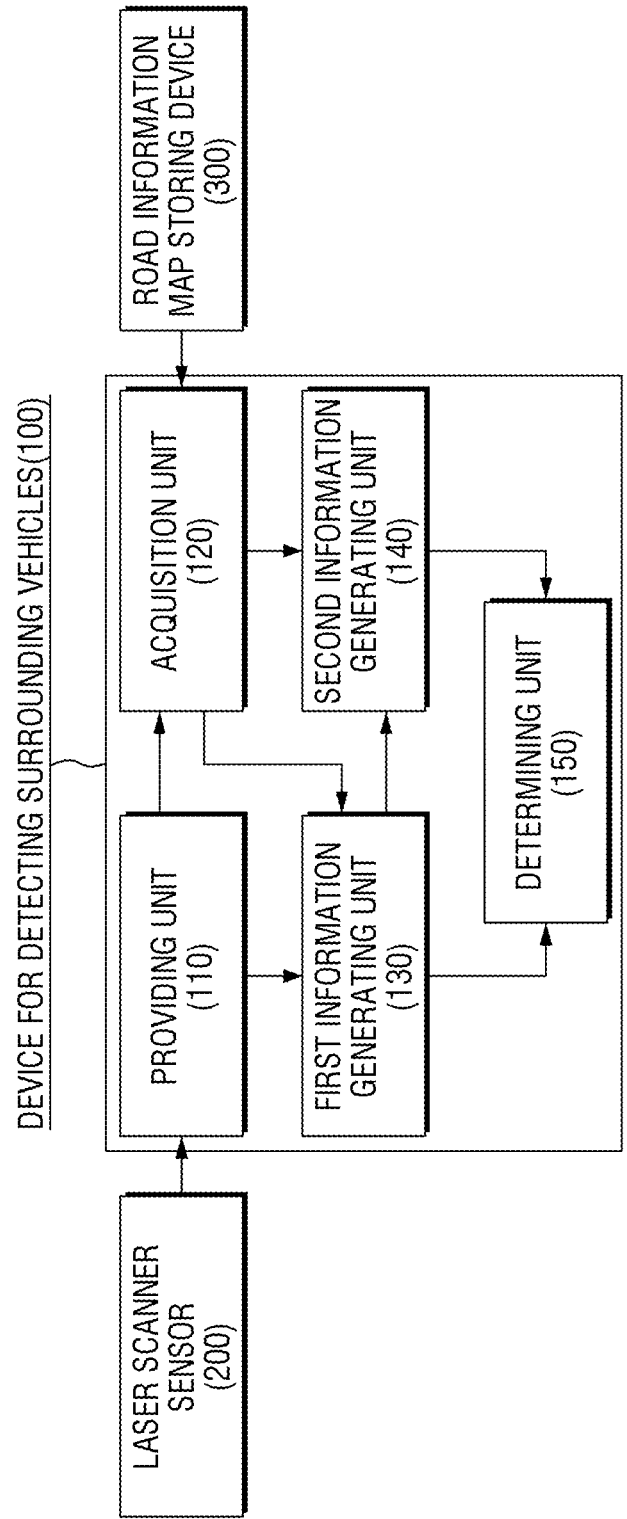
FIG. 1 is a block diagram of a device for detecting surrounding vehicles, according to an exemplary embodiment.

FIG. 1 is a block diagram of a device for detecting surrounding vehicles, according to an exemplary embodiment.

The expression "detecting surrounding vehicles," as used herein, means detecting information about a location and a traveling direction of any surrounding vehicles (or objects) of a vehicle which is being operated and driven.

Referring to FIG. 1, a device 100 for detecting surrounding vehicles may include a providing unit 110, an acquisition unit 120, a first information generating unit 130, a second information generating unit 140, and a determining unit 150.

The providing unit 110 may receive information collected by a laser scanner sensor 200, which is installed in or connected to the vehicle. The providing unit 110 and the laser scanner sensor 200 may be connected via wired or wireless communication.

The laser scanner sensor 200, which transmits information to the providing unit 110 of the apparatus 100, may be a three-dimensional (3D) laser scanner sensor 200 or may be a two-dimensional (2D) laser scanner sensor 200, which is relatively cheap. A 2D laser scanner sensor has a higher false detection rate than a 3D laser scanner sensor, but may be used because the device 100 can lower the rate of false detection. However, the laser scanner sensor 200 may be replaced by a different type of sensor or detector, according to an exemplary embodiment.

Figure 2:
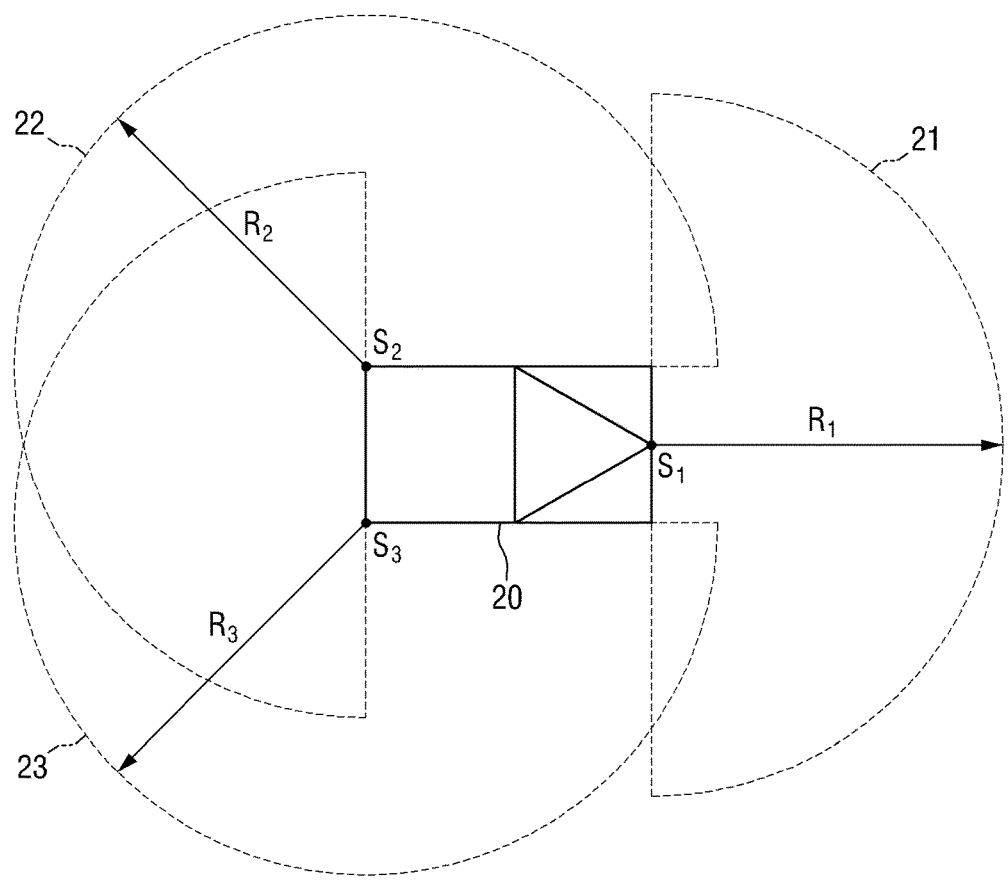
FIG. 2 illustrates an exemplary detection range of two-dimensional (2D) laser scanner sensors installed in a vehicle, according to an exemplary embodiment.

FIG. 2 illustrates an exemplary detection range of 2D laser scanner sensors installed in a vehicle which is being operated or driven.

Referring to FIG. 2, in order to sense the surroundings of a vehicle 20, i.e., a 360-degree range of the center of the vehicle 20, three 2D laser scanners may be installed in the vehicle 20. According to an exemplary embodiment, the device 100 for detecting surrounding vehicles may be installed in the vehicle 20. According to an exemplary embodiment, however, a part of the device 100 for detecting surrounding vehicles, e.g., the device 100 illustrated in FIG. 1 except the laser scanner sensor 200 may be connected to the vehicle 20 in a wired or wireless manner.

More specifically, a 2D laser scanner $S_1$ may be installed at the center of the front of the vehicle 20, and two 2D laser scanners $S_2$ and $S_3$ may be provided at both rear ends, respectively, of the vehicle 20.

The 2D laser scanner $S_1$ may sense a semicircular region 21 with a radius $R_1$. The 2D laser scanner $S_2$ may sense an almost circular region 22 with a radius $R_2$. The 2D laser scanner $S_2$ may sense an almost circular region 23 with a radius $R_3$. The radiuses $R_1$, $R_2$, and $R_3$ may be about 50 m, and may vary depending on the performance and settings of the 2D laser scanners.

By combining the sensing areas of the 2D laser scanners $S_1$, $S_2$, and $S_3$, the 360-degree range of the vehicle 20 may all be covered. FIG. 2 illustrates an example of sensing the surroundings of the vehicle 20 by installing three 2D laser scanners, but the inventive concept is not limited thereto. Alternatively, four laser scanners may be installed in the vehicle 20.

Referring again to FIG. 1, the acquisition unit 120 acquires valid data from sensing data received by the providing unit 110.

The acquisition unit 120 will hereinafter be described with reference to FIG. 1.

The acquisition unit 120 may classify sensing data, which is obtained by the laser scanner sensor 200 sensing the surroundings of the vehicle 20 and is received by the providing unit 110 into one or more groups, according to predefined settings (such as settings regarding a locational interval between data and the number of data that exist at regular locational intervals). More specifically, for example, the acquisition unit 120 may classify the sensing data according to an interval between the sensing data.

Also, the acquisition unit 120 may acquire only data that exists on a road, from among the classified data, as valid data. The data that exists on the road may be detected using the distribution of the sensing data or road information data.

Alternatively, the acquisition unit 120 may acquire valid data by classifying only the data that exists on the road, from among the sensing data, into one or more groups according to predefined settings.

The first information generating unit 130 may generate first location information or first location P1 about at least one nearby vehicle and first traveling direction information or first direction D1 about the nearby vehicle by matching the valid data acquired by the acquisition unit 120 with a preset vehicle model. The preset vehicle model may be box-shaped. Hereinafter, the "location information" and the "location" may be regarded as having the same meaning, and thus, are interchangeably used. Also, the "direction information" and the "direction" may also be regarded as having the same meaning, and thus, are interchangeably used.

To match the acquired valid data to the preset vehicle model, the first information generating unit 130 may assume that the valid data is a line or a combination of lines.

The first information generating unit 130 may generate the first location information P1 and the first traveling direction information D1 for each box shape matched to the preset vehicle model from among the valid data (in which case, each box shape may be considered a nearby vehicle).

The first information generating unit 130 may generate first location information and first traveling direction information of a box matched to the preset vehicle model only when a matching rate between the valid data acquired by the acquisition unit 120 and the preset vehicle model is higher than a predetermined level (i.e., when the probability of a detected entity being a vehicle is high).

Also, the first information generating unit 130 may use road information data, which includes information about a direction that can be travelled in each lane, to generate the first traveling direction information of the box matched to the preset vehicle model.

The road information data may be stored in a road information map storing device 300. The road information map storing device 300 may be a device storing the road information data, which includes a variety of road information such as a Route Network Definition File (RNDF). The road information data includes information about a direction that can be travelled in each lane. Also, the road information data may also include location information about a center of each lane. The center of each lane means a midpoint of a lane width.

Figure 3:
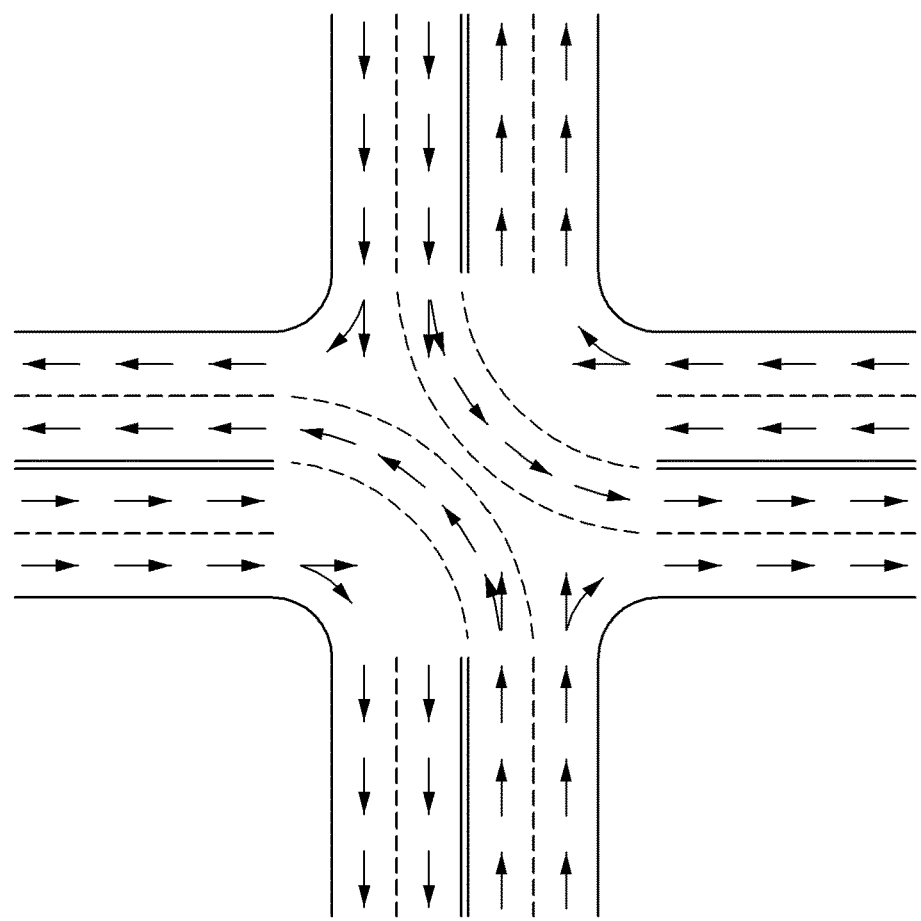
FIG. 3 illustrates information about a direction that can be travelled in each lane, which is included in road information data, according to an exemplary embodiment.

FIG. 3 illustrates information about a direction that can be travelled in each lane, which is included in road information data.

Referring to FIG. 3, the road information data may include the information about the direction that can be travelled in each lane.

Referring further to FIG. 1, a method used for the first information generating unit 130 to generate the first location information P1 and the first traveling direction information D1 may be referred to as a box model fitting method. That is, the first information generating unit 130 may generate the first location information P1 and the first traveling direction information D1 using the box model fitting method.

The first information generating unit 130 may determine the center of a box matched to the preset vehicle model as a location of the center of a nearby vehicle, i.e., the first location information P1 of the nearby vehicle.

Also, the first information generating unit 130 may generate the first traveling direction information D1 based on an attribute, e.g., a slope, of the box (or the nearby vehicle) matched to the preset vehicle model and the road information data, particularly, the information about the direction that can be travelled in each lane.

Figure 4:
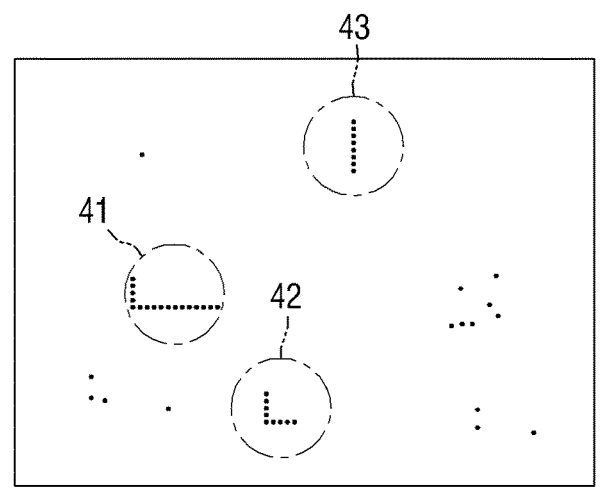
FIG. 4 illustrates exemplary valid data acquired by an acquisition unit of a device for detecting surrounding vehicles, according to an exemplary embodiment.

FIG. 4 illustrates exemplary valid data acquired by an acquisition unit of a device for detecting surrounding vehicles, according to an exemplary embodiment.

Sensing data sensed by the laser scanner sensor 200 and provided to the providing unit 110 is as illustrated in FIG. 4. Referring to FIG. 4, each sensing data sensed by the laser scanner sensor 200 is marked as a dot which may have at least 2D coordinates. The acquisition unit 120 may acquire valid data, classified into one or more groups according to predefined settings (such as settings regarding a locational interval between data and the number of data that exist at regular locational intervals), from the sensing data provided to the providing unit 110.

In FIG. 4, reference numerals 41, 42, and 43 represent respective valid data that are acquired, and classified into one or more groups, by the acquisition unit 120.

Figure 5:
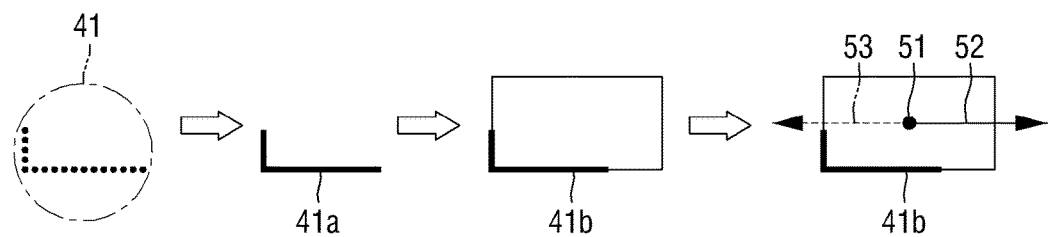
FIGS. 5 through 7 illustrate first location information and first traveling direction information of various nearby vehicles acquired by a first information generating unit of a device for detecting surrounding vehicles, according to exemplary embodiments.
Figure 6:
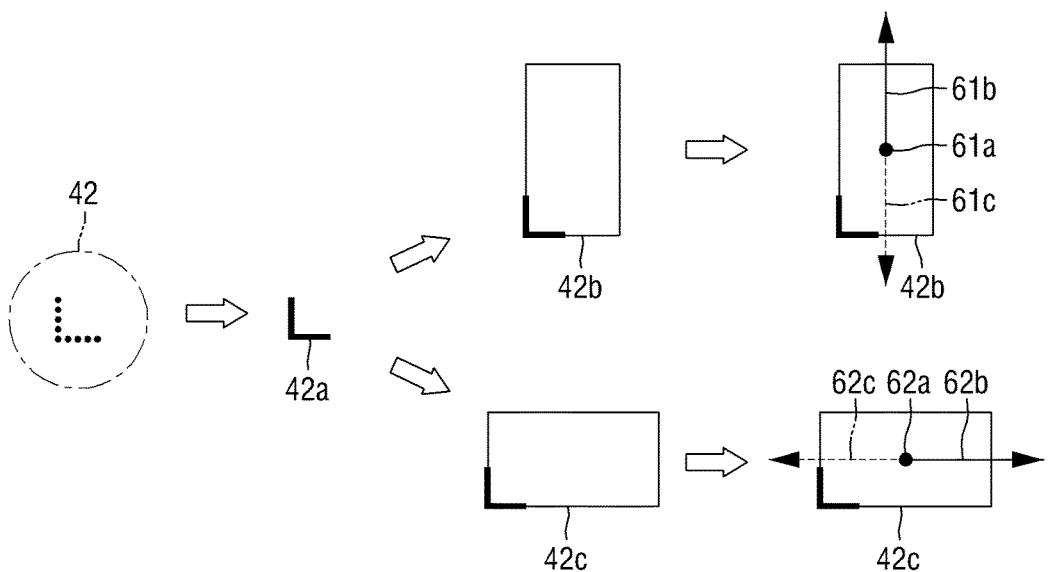
Figure 7:
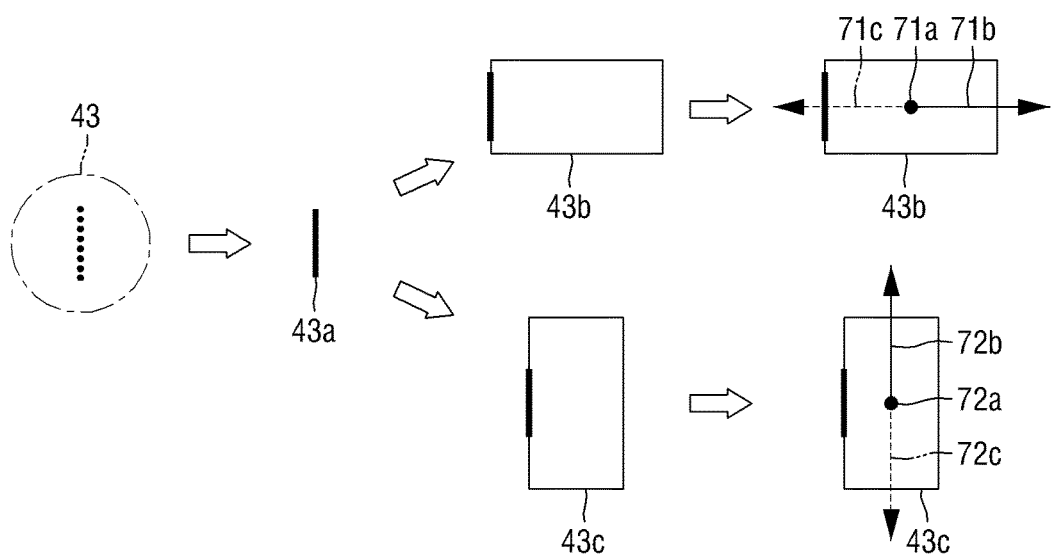

FIGS. 5 through 7 illustrate first location information P1 and first traveling direction information D1 of various nearby vehicles, acquired by a first information generating unit of a device for detecting surrounding vehicles, according to exemplary embodiments.

More specifically, FIG. 5 illustrates a process performed by the first information generating unit 130 for generating first location information and first traveling direction information of a nearby vehicle (represented by a box shape) matched to valid group data 41 which is classified and grouped by the acquisition unit 120.

The first information generating unit 130 may display the valid group data 41 as a line 41a. Also, the first information generating unit 130 may match the line 41a to a box 41b of a preset size.

The box of the preset size is a simple representation of a vehicular shape, as mentioned above, and may be rectangular.

For convenience, the box 41b matched by the first information generating unit 130 will hereinafter be referred to as a first nearby vehicle, which is a nearby vehicle detected from the surroundings of the vehicle 20 of FIG. 2.

The first information generating unit 130 may generate a location of a center of the box 41b as the first location information of the first nearby vehicle.

Also, the first information generating unit 130 may generate one of two directions 52 and 53 that originate from the center of the box 41b and are perpendicular to the short sides of the box 41b, which is rectangular, as the first traveling direction information of the first nearby vehicle.

The first information generating unit 130 may use road information data, which includes information about a direction that can be travelled in each lane, to choose one of the directions 52 and 53 as the traveling direction of the first nearby vehicle.

More specifically, the first information generating unit 130 may choose whichever of the directions 52 and 53 is more similar than the other direction to the direction that can be travelled in each lane, which is included in the road information data. For example, as illustrated in FIG. 5, the direction 52 may be chosen as the first traveling direction of the first nearby vehicle.

FIG. 6 illustrates a process performed by the first information generating unit 130 for generating first location information and first traveling direction information of a nearby vehicle (represented by a box shape) matched to valid group data 42 which is classified and grouped by the acquisition unit 120.

The first information generating unit 130 may display the valid group data 42 as a line 42a. Also, the first information generating unit 130 may match the line 42a to a box 42b and/or a box 42c (or, for example, a rectangular shape) of a preset size.

For convenience, the box 42b or 42c matched by the first information generating unit 130 will hereinafter be referred to as a second nearby vehicle, which is another nearby vehicle detected from the surroundings of the vehicle 20 of FIG. 2.

After comparing the group data 42 of FIG. 6 with the group data 41 of FIG. 5, it is apparent that the amount of sensing data corresponding to the group data 42 is more insufficient than the amount of sensing data corresponding to the group data 41. Due to the shortage of the sensing data, it is unclear in which direction the line 42a corresponding to the group data 42 extends long or extends short. Thus, the first information generating unit 130 may consider all types of rectangular boxes, i.e., the boxes 42b and 42c, as a match for the line 42a.

Referring further to FIG. 6, the first information generating unit 130 may acquire a first location 61a of the second nearby vehicle and candidate first traveling directions 61b and 61c of the second nearby vehicle from the box 42b. Also, the first information generating unit 130 may acquire a first location 62a of the second nearby vehicle and candidate first traveling directions 62b and 62c of the second nearby vehicle from the box 42c.

The first information generating unit 130 may generate first location information and first traveling direction information of the second nearby vehicle using the information about the direction that can be travelled in each lane, which is included in the road information data.

More specifically, the first information generating unit 130 may acquire, from the road information data, a direction that can be travelled in a lane corresponding to the first location 61a acquired from the box 42b. Then, the first information generating unit 130 may determine whether the acquired direction is a valid traveling direction by determining whether an angle between the acquired direction and the candidate first traveling direction 61b or 61c acquired from the box 42b is less than a predetermined angle (wherein the angle between the acquired direction and the candidate first traveling direction 61b or 61c acquired from the box 42b may be zero if the acquired direction and the candidate first traveling direction 61b or 61c are identical, and may be 180 degrees if the acquired direction and the candidate first traveling direction 61b or 61c are opposite to each other).

Similarly, the first information generating unit 130 may acquire, from the road information data, a direction that can be travelled in a lane corresponding to the first location 62a acquired from the box 42c. Then, the first information generating unit 130 may determine whether the acquired direction is a valid traveling direction by determining whether an angle between the acquired direction and the candidate first traveling direction 62b or 62c acquired from the box 42b is less than the predetermined angle.

There may be one valid traveling direction or two or more valid first traveling directions. The first information generating unit 130 may generate a valid first traveling direction (for example, the candidate first traveling direction 62b of FIG. 6) that is more similar than other valid first traveling directions to the direction that can be travelled in each lane (i.e., forms a smaller angle than other valid first traveling directions with respect to the direction that can be travelled in each lane) as a first traveling direction of the second nearby vehicle.

Also, the first information generating unit 130 may generate the center 62a of the box 42c used to acquire the first traveling direction 62b as the first location of the second nearby vehicle.

In the case of FIG. 7, like in the case of FIG. 6, the first information generating unit 130 may acquire candidate first locations 71a and 72b and candidate first traveling directions 71c, 71b, 72b, and 72c of a third nearby vehicle (i.e., a nearby vehicle corresponding to a box 43b or 43c). More specifically, the first information generating unit 130 may generate the candidate first traveling direction 71b as a first traveling direction of the third nearby vehicle. Also, the first information generating unit 130 may generate the candidate first location 71a as the first location of the third nearby vehicle.

Since a line 43a of FIG. 7 is not bent, but straight, the line 43a may be matched to various types of boxes such as even a square box.

Group data represented by a line such as the line 43a of FIG. 7 may be set not to be selected as a valid data group, and predetermined matching criteria may be set in case such group data is selected as a valid data group and then matched to a preset box. For example, the predetermined matching criteria may be set such that the line 43a can be matched to a middle part of a side of a preset box in a forward direction. Examples of the preset box may include not only the boxes 43b and 43c of FIG. 7, and but also two other boxes that are in symmetry with the boxes 43b and 43c, respectively. Even in a case in which examples of the preset box further include the two boxes that are in symmetry with the boxes 43b and 43c, respectively, first location information and first traveling direction information of the third nearby vehicle may also be generated using the same method as that described above with reference to FIG. 6.

The second information generating unit 140 will hereinafter be described with reference to FIG. 1.

The second information generating unit 140 may determine an energy state of a nearby vehicle.

Also, the second information generating unit 140 may generate second traveling direction information D2 of the nearby vehicle based on the first location information P1 of the nearby vehicle generated by the first information generating unit 130, the road information data provided by the road information map storing device 300, and the determined energy state of the nearby vehicle.

More specifically, the second information generating unit 140 uses an assumption that a vehicle needs energy to leave a lane that it is currently located in. That is, the second information generating unit 140 generates second location information and second traveling direction information of the nearby vehicle, assuming that the nearby vehicle continues to travel along its current lane, even if movement of the nearby vehicle is detected from a corresponding lane, unless the energy state of the nearby vehicle exceeds a predetermined state.

The second information generating unit 140 may determine whether the nearby vehicle has an intention to change lanes by determining whether the energy state of the nearby vehicle exceeds the predetermined state. The second information generating unit 140 may determine the nearby vehicle as having no intention to change lanes if the energy state of the nearby vehicle does not exceed the predetermined state. The second information generating unit 140 may generate the second location information and the second traveling direction information of the nearby vehicle determined as having no intention to change lanes, using the road information data.

More specifically, the second information generating unit 140 may acquire a direction that can be travelled in a lane corresponding to the location of the nearby vehicle from the road information data using the first location information P1 of the nearby vehicle generated by the first information generating unit 130.

The second information generating unit 140 may generate the acquired direction as second traveling direction information P2 of the nearby vehicle.

Also, the second information generating unit 140 may generate a midpoint of the lane, corresponding to the first location information P1 of the nearby vehicle generated by the first information generating unit 130, as the second location information of the nearby vehicle.

The term "the midpoint of a lane", as used herein, denotes the midpoint of a lane width. That is, the second location information P2 of the nearby vehicle generated by the second information generating unit 140, and the first location information P1 of the nearby vehicle generated by the first information generating unit 130 may have a same coordinate on an axis (for example, the y-axis) representing a traveling direction, but have different coordinates on an axis (for example, the x-axis) perpendicular to the axis representing the traveling direction. Alternatively, the y-axis coordinates of the second location information P2 of the nearby vehicle generated by the second information generating unit 140, and the first location information P1 of the nearby vehicle generated by the first information generating unit 130 may also differ from each other due to a difference between the first traveling direction information D1 of the nearby vehicle generated by the first information generating unit 130, and the direction that can be travelled in each lane, which is included in the road information data.

The determining unit 150, which will be described later in detail, may determine a final location of the nearby vehicle based on the first location information P1 of the nearby vehicle generated by the first information generating unit 130, and the second location information P2 of the nearby vehicle generated by the second information generating unit 140.

Also, the determining unit 150 may determine a final traveling direction of the nearby vehicle based on the first traveling direction information D1 of the nearby vehicle generated by the first information generating unit 130, and the second traveling direction information D2 of the nearby vehicle generated by the second information generating unit 140.

That is, the second location information P2 and the second traveling direction information D2 generated by the second information generating unit 140 may reduce possible error in the first location information P1 and the first traveling direction information D1 of the nearby vehicle generated by the first information generating unit 130.

Figure 8:
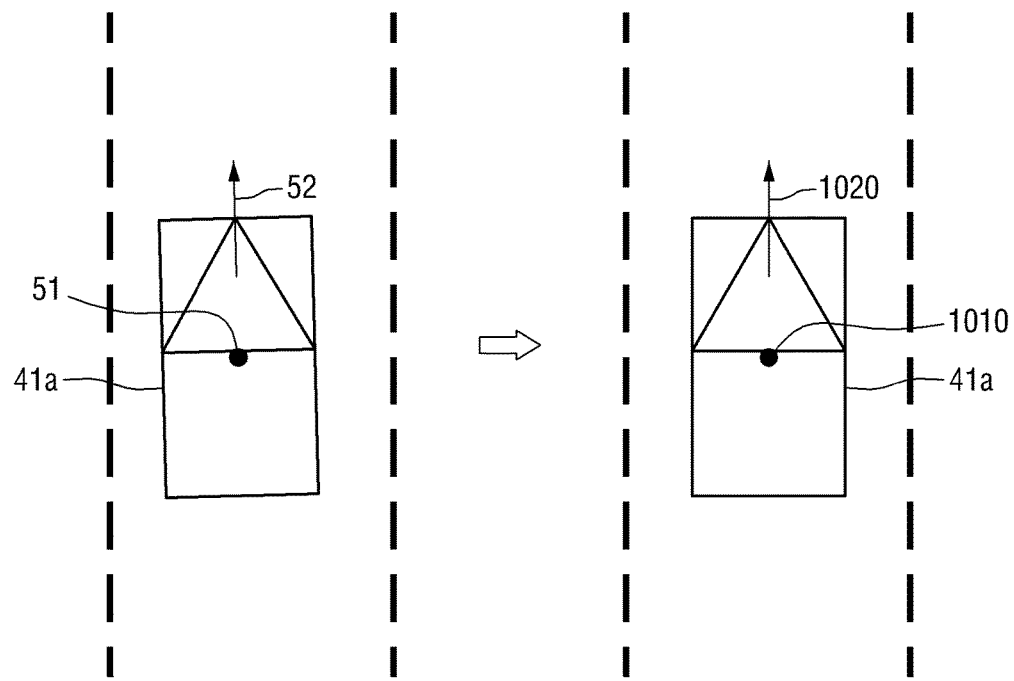
FIG. 8 illustrates an example of generating second location information and second traveling direction information of a first nearby vehicle generated by a second information generating unit, according to an exemplary embodiment.

FIG. 8 illustrates an example of generating second location information and second traveling direction information of a first nearby vehicle by a second information generating unit, according to an exemplary embodiment.

A first location 51 and a first traveling direction 52 of a first nearby vehicle generated or determined by the first information generating unit 130 of FIG. 1, are as illustrated on the left side of FIG. 8.

The second information generating unit 140 of FIG. 1 may determine an energy state of the first nearby vehicle using the first location 51 and the first traveling direction 52 of the first nearby vehicle generated or determined by the first information generating unit 130.

If the energy state of the first nearby vehicle is determined to not exceed a predetermined state, the second information generating unit 140 may determine a midpoint 1010 of a width of a lane where the first nearby vehicle currently is as a second location of the first nearby vehicle.

Also, if the energy state of the first nearby vehicle is determined to not exceed the predetermined state, the second information generating unit 140 may acquire a direction, that can be travelled in a lane corresponding to the first location of the first nearby vehicle generated or determined by the first information generating unit 130, from the road information data, and may generate the acquired direction as a second traveling direction 1020 of the first nearby vehicle.

The second information generating unit 140 will hereinafter be described in further detail with reference to FIG. 1.

The second information generating unit 140 may determine the energy state of the nearby vehicle using the first location and the first traveling direction of the nearby vehicle generated or determined by the first information generating unit 130.

More specifically, the second information generating unit 140 may acquire information about a distance between the nearby vehicle and its nearest lane line using the first location of the nearby vehicle. Also, the second information generating unit 140 may acquire information about an angle that the nearby vehicle forms with its nearest lane line using the traveling direction of the nearby vehicle.

The second information generating unit 140 may determine an energy state of the nearby vehicle using the acquired distance information and the acquired angle information.

More specifically, the second information generating unit 140 may determine that the smaller is the distance between the nearby vehicle and its nearest lane line, the higher is the energy state of the nearby vehicle.

Also, the second information generating unit 140 may determine that the larger the angle that the nearby vehicle forms with its nearest lane line (i.e., the angle that the traveling direction of the nearby vehicle forms with the nearest lane line to the nearby vehicle), the higher the energy state of the nearby vehicle.

Also, the second information generating unit 140 may determine that as the distance between the nearby vehicle and its nearest lane line decreases or the angle that the nearby vehicle forms with its nearest lane line increases, the energy state of the nearby vehicle linearly increases. Preferably but not necessarily, the energy state of the nearby vehicle may be set to increase exponentially in this case.

The predetermined state may be set based on an energy state of the vehicle (or the nearby vehicle) when the vehicle (or the nearby vehicle) is determined to have an intention to change lanes. The predetermined state may be set using a Gaussian mixture model. More specifically, the predetermined state may be set using a 4-Guassian mixture model.

The predetermined state will hereinafter be described with reference to FIGS. 9 and 10.

Figure 9:
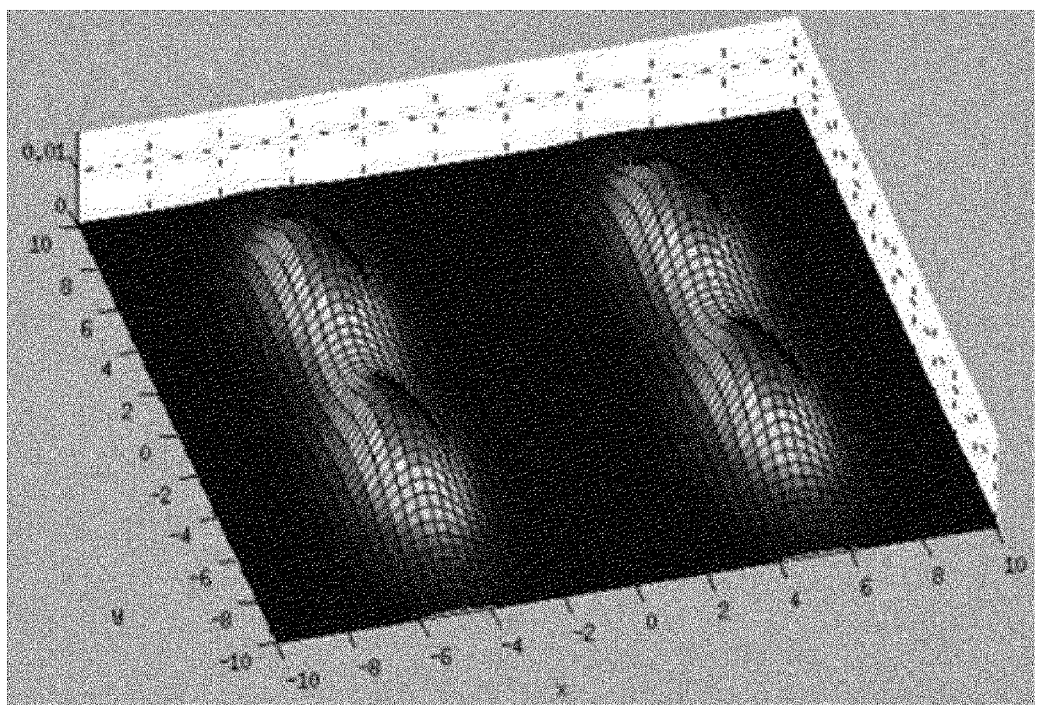
FIG. 9 shows exemplary energy state measurements obtained using a 4-Guassian mixture model, according to an exemplary embodiment.

FIG. 9 shows exemplary energy state measurement obtained using a 4-Guassian mixture model.

Referring to FIG. 9, each of four points with four highest energy levels may be set as the predetermined state. Here, the energy state may be represented by a certain type of parameter or numerical value to indicate a level of energy.

Figure 10:
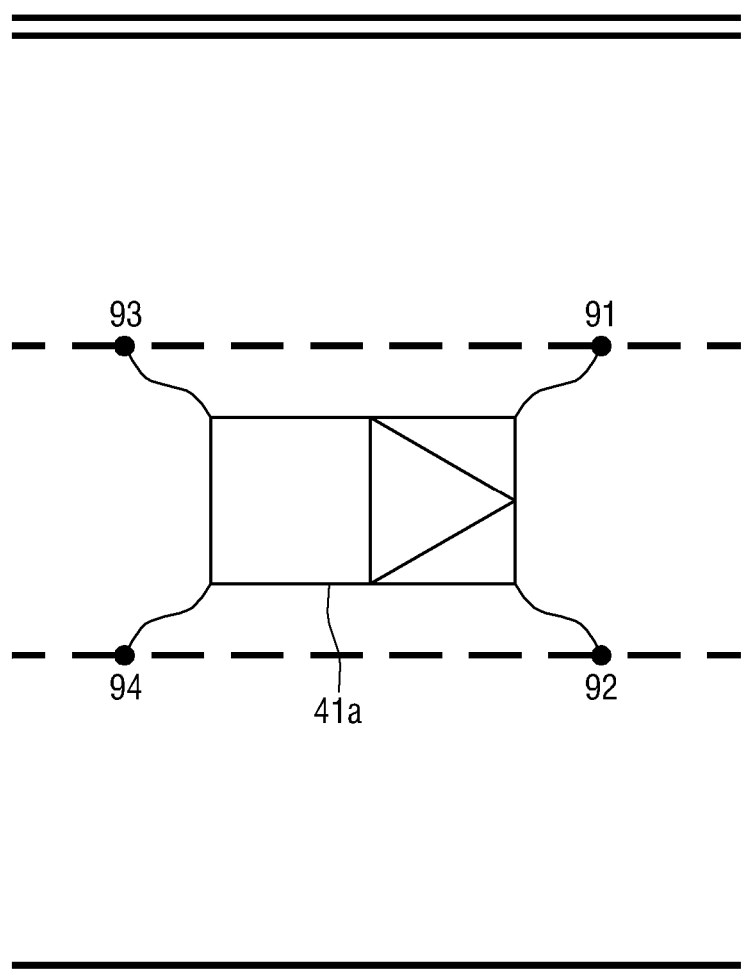
FIG. 10 illustrates an example of displaying four points having a predetermined state, detected using the 4-Gaussian mixture model, according to an exemplary embodiment.

FIG. 10 illustrates an example of displaying four points having the predetermined state, detected using the 4-Gaussian mixture model.

Referring to FIG. 10, there exist a total of four points 91, 92, 93 and 94 on both lane lines of a lane where the first nearby vehicle currently is. Each of the four points may be associated with the predetermined state using the 4-Gaussian mixture model.

The second information generating unit 140 will hereinafter be described in further detail with reference to FIG. 1.

If the energy state of the nearby vehicle exceeds the predetermined state, the second information generating unit 140 may determine that the nearby vehicle has an intention to change lanes.

More specifically, for example, it is assumed that a distance between a first location P1 of the first nearby vehicle generated or determined by the first information generating unit 130, and a lane line nearest to the first location P1 of the first nearby vehicle is less than a predetermined value, and a lane including the first location P1 of the first nearby vehicle differs from a lane where the first nearby vehicle previously was during a previous cycle generated by the first information generating unit 130.

In this example, if at least one energy state detected from the first nearby vehicle within a predefined amount of time (for example, a time period from the previous cycle to a current time or a time period corresponding to, or longer than, one cycle) exceeds the predetermined state, the second information generating unit 140 may acquire a direction that can be travelled in the lane including the first location P1 of the first nearby vehicle from the road information data and may generate the acquired direction as second traveling direction information D2 of the first nearby vehicle.

If none of the energy states detected from the first nearby vehicle within the predefined amount of time exceed (or are above) the predetermined state, the second information generating unit 140 may acquire a direction that can be travelled in the lane where the first nearby vehicle previously was during the previous cycle from the road information data, and may generate the acquired direction as the second traveling direction information D2 of the first nearby vehicle.

That is, even if the first location P1 of the first nearby vehicle, generated by the first information generating unit 130, indicates that the first nearby vehicle is currently located in a different lane from the lane where it previously was during the previous cycle (i.e., even if the first nearby vehicle has changed lanes), the second information generating unit 140 may determine that the first nearby vehicle has not changed lanes if the energy state of the first nearby vehicle has not exceeded the predetermined state, and may generate second location information of the first nearby vehicle, indicating that the first nearby vehicle is still located in the lane where it previously was during the previous cycle. In other words, it may be determined that there is error in the first location information of the first nearby vehicle, generated by the first information generating unit 130, and such error may be corrected based on the second location information of the first nearby vehicle generated by the second information generating unit 140.

The determining unit 150 will hereinafter be described with reference to FIG. 1.

The determining unit 150 determines a final location of the nearby vehicle based on the first location P1 of the nearby vehicle generated by the first information generating unit 130, and the second location P2 of the nearby vehicle generated by the second information generating unit 140.

Also, the determining unit 150 determines a final traveling direction of the nearby vehicle based on the first traveling direction information of the nearby vehicle generated by the first information generating unit 130, and the second traveling direction information of the nearby vehicle generated by the second information generating unit 140.

For example, the determining unit 150 may determine averages of coordinates of the first location of the first nearby vehicle generated or determined by the first information generating unit 130, and coordinates of the second location of the second nearby vehicle generated or determined by the first information generating unit 130 as the final location of the first nearby vehicle.

Also, the determining unit 150 may determine an average of a first traveling direction of the first nearby vehicle generated or determined by the first information generating unit 130, and a second traveling direction of the second nearby vehicle generated or determined by the first information generating unit 130 as a final traveling direction of the first nearby vehicle.

The determining unit 150 may not necessarily use the averages of the first information generated by the first information generating unit 130 and the second information generated by the second information generating unit 140 to determine the final traveling direction and the final location of the first nearby vehicle. That is, the determining unit 150 may determine the final information (such as the final location and the final traveling direction) by increasing a weighted value of the first information (such as first location information and first traveling direction information) generated by the first information generating unit 130 and lowering a weighted value of the second information (such as second location information and second traveling direction information) generated by the second information generating unit 140.

Alternatively, the determining unit 150 may determine the final information (such as the final location and the final traveling direction) by lowering the weighted value of the first information (such as first location information and first traveling direction information) generated by the first information generating unit 130 and increasing the weighted value of the second information (such as second location information and second traveling direction information) generated by the second information generating unit 140.

For example, in a road environment (such as in downtown) where traffic congestion is highly likely and unexpected events often occur, the determining unit 150 may determine the final information by increasing the weighted value of the first information generated by the first information generating unit 130. For example, in a road environment (such as on highways) where traffic is smooth, the determining unit 150 may determine the final information by increasing the weighted value of the second information generated by the second information generating unit 140.

The device 100 may further include an additional correcting unit (not illustrated).

The additional correcting unit may perform additional correction on the final location and the final direction of the nearby vehicle using a Kalman filter.

For example, it is assumed that there exists final location and direction information of the first nearby vehicle at a time t, final location and direction information of the first nearby vehicle at a time t−1, and final location and direction information of the first nearby vehicle at a time t−2, determined by the determining unit 150.

The additional correcting unit estimates final location and direction information of the first nearby vehicle at the time t based on the final location and direction information of the first nearby vehicle at the time t−2 and the final location and direction information of the first nearby vehicle at the time t−1.

The additional correcting unit may change the settings of the determining unit 150 by comparing the final location and direction information at the time t determined by the determining unit 150, with the estimated location and direction information of the first nearby vehicle at the time t. The additional correcting unit may use a Kalman filter to compare the determined final location and direction information of the first nearby vehicle at the time t with the estimated location and direction information of the first nearby vehicle at the time t.

Figure 11:
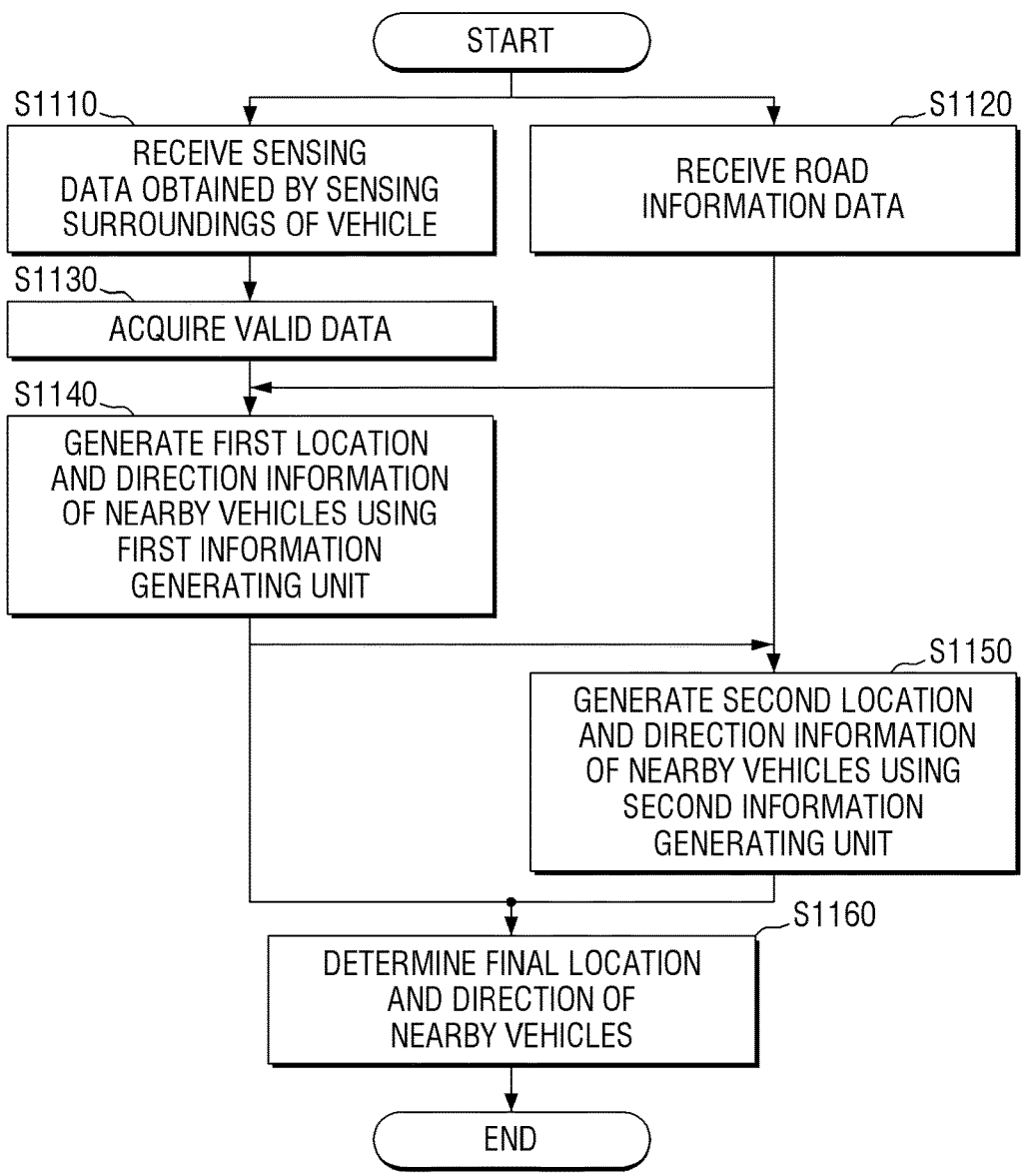
FIG. 11 is a flowchart illustrating a method of detecting surrounding vehicles, according to an exemplary embodiment.

FIG. 11 is a flowchart illustrating a method of detecting surrounding vehicles in reference to FIG. 1, according to an exemplary embodiment.

Referring to FIG. 11, the providing unit 110 may receive sensing data obtained by sensing surroundings of an operating vehicle with a laser scanner (for example, a 2D laser scanner) (S1110).

The acquisition unit 120 may acquire valid data from the sensing data received in S1110 (S1130).

The first information generating unit 130 may receive road information data, which includes information about a direction that can be travelled in each lane, from the road information map storing device 300 (S1120).

The first information generating unit 130 may generate first location information and first traveling direction information of a nearby vehicle using the valid data acquired in S1130 and the road information data received in S1120 (S1140).

The second information generating unit 140 may determine an energy state of the nearby vehicle, and may generate second location information and direction information of the nearby vehicle using the determined energy state of the nearby vehicle, the first information generated by the first information generating unit 130, and the road information data (S1150).

The determining unit 150 may determine a final location and a final traveling direction of the nearby vehicle using the first information generated by the first information generating unit 130 and the second information generated by the second information generating unit 140 (S1160).

In the method of FIG. 11, the device 100 may be used. Also, the description of the device 100 that has been explained above with reference to FIGS. 1 through 10 may apply to the above method of detecting surrounding vehicles.

The above method of detecting surrounding vehicles may be implemented as computer-readable code on a computer-readable recording medium.

That is, a computer-readable recording medium having recorded thereon the method of detecting surrounding vehicles may be a computer-readable recording medium having recorded thereon a program executing: (a) receiving sensing data obtained by sensing surroundings of an operating vehicle with the laser scanner sensor 200 of the operating vehicle; (b) acquiring valid data from the received sensing data; (c) generating first location information and first traveling direction information of a plurality of nearby vehicles by matching the acquired valid data to a preset vehicle model; (d) determining an energy state of a first nearby vehicle, which is detected from the surroundings of the operating vehicle, and generating second traveling direction information of the first nearby vehicle based on the first location of the first nearby vehicle, among the first location information generated in (c), road information data, which includes information about a direction that can be travelled in each lane, and the determined energy state of the first nearby vehicle; and (e) determining a final direction of the first nearby vehicle based on the first traveling direction of the first nearby vehicle, generated in (c), and the second traveling direction of the first nearby vehicle, generated in (d).

Examples of the computer-readable recording medium include nearly all types of recording media capable of storing data that can be read by a computer system. Examples of the computer-readable recording medium include, but are not limited to, random-access memories (RAMs), read-only memories (ROMs), CD-ROMs, magnetic tapes, optical data storage devices, and floppy disks. The computer-readable recording medium can also be embodied as data transmission through the Internet or carrier waves.

The computer-readable recording medium can be distributed over network-coupled computer systems so that computer-readable code is stored and executed in a distributed fashion. Also, functional programs, codes, and code segments for accomplishing the present disclosure can be easily construed as within the scope of the inventive concept by programmers skilled in the art to which the present disclosure pertains.

Figure 12:
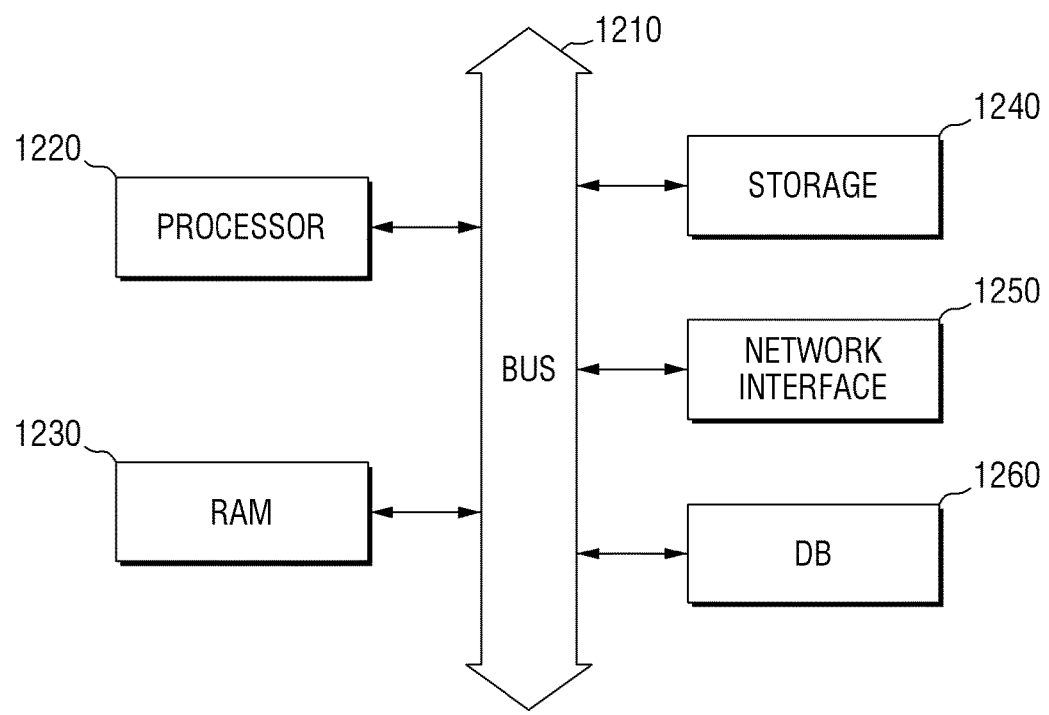
FIG. 12 illustrates a hardware configuration that a device for detecting surrounding vehicles according to an exemplary embodiment may have.

FIG. 12 illustrates a hardware configuration that a device for detecting surrounding vehicles, according to an exemplary embodiment may have.

The device may have a structure as illustrated in FIG. 12.

Referring to FIG. 12, the device may include a system bus 1210, a processor 1220, a RAM 1230, a storage 1240, and a network interface 1250 for communication with an external device. Computer program code that can embody the device may be stored in the storage 1240, may be loaded onto the RAM 1230, and may be executed by the processor 1220.

The device 100 and the method for detecting surrounding vehicles can reduce error in location information and traveling direction information of nearby vehicles.

Also, the device 100 and the method for detecting surrounding vehicles can detect nearby vehicles with precision without using a 3D laser scanner sensor 200, which is relatively more expensive than the 2D laser scanner sensor 200.

The device 100 and the method for detecting surrounding vehicles may be used in an unmanned vehicle.

At least one of the components, elements, modules or units represented by a block as illustrated in FIG. 1 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

In concluding the detailed description, those skilled in the art will appreciate that many variations and modifications can be made to the exemplary embodiments without substantially departing from the principles of the inventive concept. Therefore, the disclosed embodiments of the inventive concept are used in a generic and descriptive sense only and not for purposes of limitation.

What is claimed is:

1. A device for detecting surrounding vehicles of an operating vehicle, the device comprising at least one processor to implement:
    an acquisition unit configured to identify valid data, among sensing data received from a sensor installed in the operating vehicle, based on a predetermined setting;
    a first information generating unit configured to generate first location information and first traveling direction information of one or more nearby vehicles including a first nearby vehicle, of an operating vehicle by matching the valid data to a preset vehicle model;
    a second information generating unit configured to determine an energy state of the first nearby vehicle, and generate second traveling direction information of the first nearby vehicle based on the first location information of the first nearby vehicle, road information data which includes information about a direction that is set to be travelled in each lane in a road where the operating vehicle is traveling, and the energy state of the first nearby vehicle; and
    a determining unit configured to determine a final traveling direction of the first nearby vehicle based on the first traveling direction information of the first nearby vehicle and the second traveling direction information of the first nearby vehicle.

2. The device of claim 1, further comprising:
    a providing unit configured to receive the sensing data from the sensor and provides the sensing data to the acquisition unit.

3. The device of claim 2, wherein the acquisition unit identifies one or more data groups of the sensing data, which are related to the road, as the valid data, and
wherein the first information generating unit generates the first location information and the first traveling direction information of the nearby vehicles by matching each of the data groups to the preset vehicle model.

4. The device of claim 3, wherein the sensing data comprises a plurality of dots, each having a coordinate, and
wherein the one or more data groups has a form of a line or a combination of lines, the line comprising a group of dots having preset intervals.

5. The device of claim 3, wherein the first information generating unit generates the first traveling direction information of the first nearby vehicle corresponding to a particular group matched to the preset vehicle model, using the road information data.

6. The device of claim 1, wherein if the determined energy state is below a predetermined state, the second information generating unit acquires a direction that is set to be travelled in a lane including a first location in the road, corresponding to the first location information, of the first nearby vehicle from the road information data, and generates the direction as the second traveling direction information of the first nearby vehicle.

7. The device of claim 1, wherein if a distance between the first location, corresponding to the first location information, of the first nearby vehicle and a lane line nearest to the first location of the first nearby vehicle in the road is less than a predetermined value, and a lane including the first location of the first nearby vehicle in the road differs from a lane where the first nearby vehicle was in the road during a previous cycle generated by the first information generating unit, and if at least one energy state detected from the first nearby vehicle within a preset time period exceeds the predetermined state, the second information generating unit acquires a direction that is set to be travelled in the lane including the first location of the first nearby vehicle from the road information data and generates the acquired direction as the second traveling direction information of the first nearby vehicle.

8. The device of claim 7, wherein if none of energy states detected from the first nearby vehicle within the preset time period exceed the predetermined state, the second information generating unit acquires a direction that is set to be travelled in the lane where the first nearby vehicle was during the previous cycle from the road information data and generates the acquired direction as the second traveling direction information of the first nearby vehicle.

9. The device of claim 1, wherein the second information generating unit further generates second location information of the first nearby vehicle, and determines a center of a lane in the road including the first location, corresponding to the first location information, of the first nearby vehicle as the second location information of the first nearby vehicle.

10. The device of claim 9, wherein the determining unit determines a final location and the final traveling direction of the first nearby vehicle by applying weights to the first and second location information and the first and second traveling direction information considering a traffic condition of surroundings of the operating vehicle.

11. The device of claim 1, wherein the second information generating unit determines the energy state of the first nearby vehicle using a Gaussian mixture model.

12. The device of claim 1, wherein the second information generating unit determines that the closer is the first location, corresponding to the first location information, of the first nearby vehicle to a lane line nearest to the first location, the higher is the energy state of the first nearby vehicle.

13. The device of claim 1, wherein the second information generating unit determines that the larger is an angle between a first traveling direction, corresponding to the first traveling direction information, of the first nearby vehicle and a lane line closest to the first nearby vehicle, the higher is the energy state of the first nearby vehicle.

14. A method of detecting surrounding vehicles, the method comprising:
receiving sensing data obtained by sensing surroundings of a vehicle using a sensor of the vehicle;
identifying valid data, among the sensing data received from the sensor, based on a predetermined setting;
generating first location information and first traveling direction information of one or more nearby vehicles, including a first nearby vehicle, by matching the valid data to a preset vehicle model;
determining an energy state of the first nearby vehicle, and generating second traveling direction information of the first nearby vehicle based on the first location information of the first nearby vehicle, road information data which includes information about a direction that is set to be travelled in each lane in a road where the operating vehicle is traveling, and the energy state of the first nearby vehicle; and
determining a final traveling direction of the first nearby vehicle based on the first traveling direction information of the first nearby vehicle and the second traveling direction of the first nearby vehicle.

15. The method of claim 14, wherein the identifying the valid data comprises identifying one or more data groups of the sensing data, which are related to the road, as the valid data, and
wherein the generating the first location information and the first traveling direction information of the one or more nearby vehicles comprises generating the first location information and the first traveling direction information of the nearby vehicles by matching each of the data groups to the preset vehicle model.

16. The method of claim 15, wherein the generating the first location information and the first traveling direction information of the one or more nearby vehicles comprises generating the first traveling direction information of the first nearby vehicle corresponding to a particular group matched to the preset vehicle model, using the road information data.

17. The method of claim 14, wherein the generating the second traveling direction information of the first nearby vehicle comprises:
if the energy state is below a predetermined state, acquiring a direction that is set to be travelled in a lane including a first location in the road, corresponding to the first location information, of the first nearby vehicle from the road information data; and
generating the direction as the second traveling direction information of the first nearby vehicle.

18. The method of claim 14, wherein the generating the second traveling direction information of the first nearby vehicle comprises:
further generating second location information of the first nearby vehicle; and
determining a center of a lane in the road including the first location, corresponding to the first location information, of the first nearby vehicle as the second location information of the first nearby vehicle.

19. The method of claim 14, wherein the generating the second traveling direction information of the first nearby vehicle comprises determining the energy state of the first nearby vehicle using a Gaussian mixture model.

20. A device for detecting surrounding vehicles of an operating vehicle, the device comprising at least one processor to implement:
- an acquisition unit configured to obtain, from a sensor installed in the operating vehicle, road data of a road in which the operating vehicle is traveling;
- a first information generating unit configured to generate first location information and first traveling direction information of a nearby vehicle of the operating vehicle by matching the road data to a preset vehicle model;
- a second information generating unit configured to determine, based on comparison between an energy state of the nearby vehicle and a predetermined energy state, information about a possibility of lane change of the nearby vehicle between lanes in the road, and generate second traveling direction information of the nearby vehicle based on the first location information of the first nearby vehicle, prestored road information data including information about a direction that is set to be travelled in each lane in the road, and the information about lane change by the nearby vehicle; and
- a determining unit configured to determine a final traveling direction of the first nearby vehicle based on the first traveling direction information of the first nearby vehicle and the second traveling direction information of the first nearby vehicle.

* * * * *